(12) United States Patent
Du et al.

(10) Patent No.: US 10,885,230 B1
(45) Date of Patent: Jan. 5, 2021

(54) EXTERNAL TERMINAL PROTECTION DEVICE AND PROTECTION SYSTEM

(71) Applicant: BEIJING BEYONDINFO TECHNOLOGY CO., LTD., Beijing (CN)

(72) Inventors: Hua Du, Beijing (CN); Wei Ai, Beijing (CN); Zhenhe Cai, Beijing (CN); Hao Zhang, Beijing (CN)

(73) Assignee: BEIJING BEYONDINFO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/978,772

(22) PCT Filed: Jan. 16, 2019

(86) PCT No.: PCT/CN2019/072029
§ 371 (c)(1),
(2) Date: Sep. 8, 2020

(87) PCT Pub. No.: WO2020/087781
PCT Pub. Date: May 7, 2020

(30) Foreign Application Priority Data

Oct. 29, 2018 (CN) .......................... 2018 1 1264781

(51) Int. Cl.
*G06F 21/85* (2013.01)
*G06F 21/55* (2013.01)
*G06F 21/44* (2013.01)

(52) U.S. Cl.
CPC .............. *G06F 21/85* (2013.01); *G06F 21/44* (2013.01); *G06F 21/554* (2013.01); *G06F 2221/034* (2013.01)

(58) Field of Classification Search
CPC ........ G06F 21/85; G06F 21/554; G06F 21/44; G06F 2221/034
See application file for complete search history.

(56) References Cited

U.S. PATENT DOCUMENTS 7,877,788 B1 * 1/2011 Topp ....................... G06F 21/85
726/4
2006/0072241 A1 4/2006 Feliss et al.
(Continued)

FOREIGN PATENT DOCUMENTS

CN 103532978 A 1/2014
CN 103532980 A 1/2014
(Continued)

OTHER PUBLICATIONS

International Search Report in PCT/CN2019/072029, issued by ISA, dated Jan. 16, 2019.
(Continued)

*Primary Examiner* — Christopher C Harris
(74) *Attorney, Agent, or Firm* — Zhu Lehnhoff LLP

(57) ABSTRACT

The present invention provides an external terminal protection device and a corresponding protection system, the external terminal protection device including: an interface control module, used for providing an internal interface and an external interface, the internal interface being connected to a corresponding interface of a protected host, and the external interface being configured to access one or more external devices; and a system control module, used for connecting the interface control module, and controlling security authentication of the external devices accessed to the one or more external interfaces on the interface control module, so as to determine whether the external devices are licensed access devices. The present invention can protect the security of the protected host without installing security protection software on the protected host, thereby greatly (Continued)

reducing system security risks, and comprehensively eliminating the potential security hazards that may be generated by the interfaces.

12 Claims, 3 Drawing Sheets

(56) References Cited

U.S. PATENT DOCUMENTS

| | | | | |
|---|---|---|---|---|
| 2009/0049307 A1* | 2/2009 | Lin | ............ | G06F 21/85 |
| | | | | 713/185 |
| 2009/0125646 A1* | 5/2009 | Rosenan | ............ | G06F 21/82 |
| | | | | 710/15 |
| 2015/0365237 A1* | 12/2015 | Soffer | ............ | G06F 13/105 |
| | | | | 726/20 |
| 2018/0137278 A1* | 5/2018 | Srivastava | ............ | G06F 21/606 |
| 2019/0294777 A1* | 9/2019 | Cobo | ............ | G06F 21/34 |

FOREIGN PATENT DOCUMENTS

| | | |
|---|---|---|
| CN | 203618018 U | 5/2014 |
| CN | 203618020 U | 5/2014 |
| CN | 206003099 U | 5/2014 |
| CN | 206039532 U | 5/2014 |
| CN | 105871902 A | 8/2016 |
| CN | 108537072 A | 9/2018 |
| CN | 108681677 A | 10/2018 |

OTHER PUBLICATIONS

Written Opinion of the International Search Report in PCT/CN2019/072029, issued by ISA, dated May 30, 2019.

Search Report in CN201811264781.X, issued by China's State Intellectual Property Office, dated Feb. 3, 2020.

* cited by examiner

EXTERNAL TERMINAL PROTECTION DEVICE AND PROTECTION SYSTEM

TECHNICAL FIELD

The present invention relates to the technical field of computer security, and more particularly to an external terminal protection device and a protection system.

BACKGROUND

In recent years, the computer and information technology develops rapidly, thereby greatly promoting the popularization of networks. While people are enjoying the convenience brought by the computer and information technology, the technology also brings new threats to the security of data in computers used by people in production/life, such as the following common threats: unauthorized access, personating a valid user, destroying data integrity, interfering normal system operation, utilizing a network to spread virus, man-in-the-middle eavesdrop and the like.

The technical means to solve the problem of intranet security are varied, for example, installing and using a network security product in a host such as a firewall, an anti-virus and intrusion detection system and the like. However, even if the above measures are taken, various network security events still occur frequently. According to statistics, 70% of computer crimes occur because an internal person illegally uses a key resource such as the host and the like, and the threats really coming from the outside are only 30%. The internal person lacks security awareness when using the host. The behaviors of the internal person at the back end of the firewall, such as nonstandard access of various external devices, system mis-operation or intentional damage, would result in dreadful influence on or bring heavy loss to organizations, enterprises and institutions.

Furthermore, for certain special devices, such as a host equipped with a special software control, and a device at an engineer station/staff station in certain industrial fields, generally no security protection software adapted to the system of the host/device is sold on the market because the system is special or because the installation of security software is easy to cause the compatibility problem of the original software of the host, and even influence performance. In addition, the host of the engineer station/staff station basically does not upgrade an operating system after the host gets on line. Even after security software is installed, the host generally does not update an anti-malicious code software version or a malicious code library in time, and thus cannot play an overall security protection role.

SUMMARY

On the basis of the existing status, the present invention provides an external terminal protection device and a protection system to solve the above problem. In the present invention, various interfaces of a protected host are taken over, and the use of a USB interface or a serial interface device of the protected host must be completed via the external terminal protection device, such that the USB interface or serial interface of the protected host can be protected without installing security protection software on the protected host.

In a first aspect, the present application provides an external terminal protection device, including:

an interface control module, used for providing one or more internal interfaces and one or more external interfaces, the internal interfaces being connected to corresponding interfaces of a protected host, and the external interfaces being configured to access one or more external devices; and a system control module, used for connecting the interface control module via a bus, and controlling security authentication of the external device accessed to the one or more external interfaces on the interface control module, so as to determine whether the external device is a licensed access device.

Optionally, when the external interface of the interface control module accesses the external device, the interface control module notifies, via the bus, the system control module that the system control module first performs a security authentication operation on the external device.

Optionally, if the external device does not pass the security authentication, then the external device is set to be an unlicensed access device, and a physical circuit between the external device and the protected host is kept in a disconnected state; and/or if the external device passes the security authentication, then the external device is determined to be a licensed access device, and the physical circuit between the external device and the protected host is switched on.

Optionally, the interface control module monitors in real time a connection state of the external interface accessing the external device, and automatically disconnects the physically connected circuit when the external device determined to be a licensed access device is unplugged from the external interface.

Optionally, when the external device is re-accessed after being unplugged from the external interface, the system control module re-performs the security authentication operation on the external device.

Optionally, the interface control module monitors in real time a connection state of the internal interface connected to the corresponding interface of the protected host;

when the connection state is abnormal, the disconnection of a circuit between the interface control module and the protected host is automatically triggered.

Optionally, when the connection state is abnormal, automatically triggering the disconnection of the circuit between the interface control module and the protected host further includes:

capturing a current/voltage change of the internal interface via a monitoring circuit, determining that the connection state is abnormal, and triggering an alarm indication signal.

Optionally, after the disconnection of the circuit between the interface control module and the protected host is automatically triggered, the connection state restores from abnormality to normality, and the circuit between the interface control module and the protected host is still kept in the disconnected state.

Optionally, the system control module controls, on the basis of a preset security policy, the security authentication of the external device accessed to the one or more external interfaces on the interface control module.

Optionally, the external terminal protection device further includes: an internal memory, used for storing data exchanged between the interfaces.

Optionally, the interface control module adopts a current and voltage limited circuit to prevent the external terminal protection device from being damaged when the external interface accesses a strong discharging device.

Optionally, one or more of the internal interfaces and the external interfaces are USB interfaces.

Optionally, one or more of the internal interfaces and the external interfaces are serial interfaces.

In a second aspect, the present application provides a protection system, including:
one or more external devices,
a protected host, and
the external terminal protection device as described above, wherein the external terminal protection device is externally connected to the protected host, such that the one or more external devices perform interface communication with the protected host via the external terminal protection device.

The technical solution of the present invention at least has the following one or more technical effects: the present invention takes over various data interfaces of the protected host, so as to ensure that the data communications of the interfaces of the protected host are all completed via the external device; the present invention can protect the security of the protected host without installing security protection software on the protected host, thereby greatly reducing system security risks, and comprehensively solving potential security hazards that may be generated by the interfaces.

DETAILED DESCRIPTION

Figure 1:
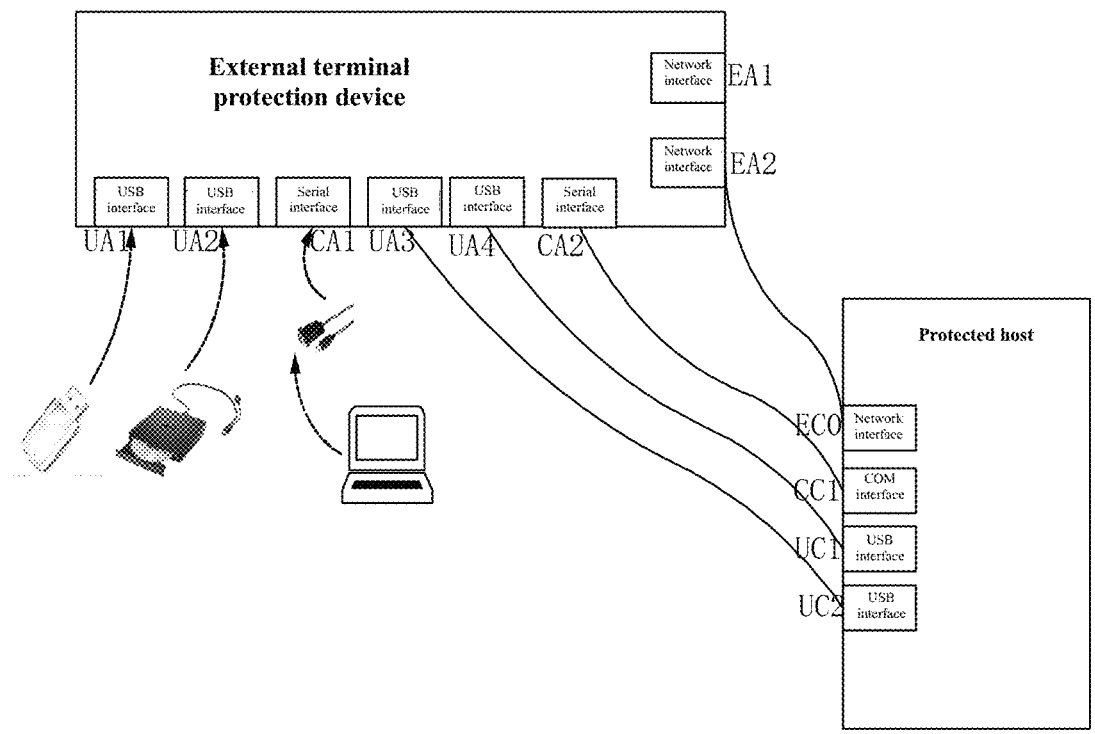
FIG. 1 is a schematic view of an application scenario of a protection system based on an external terminal protection device according to a first embodiment of the present invention.

The exemplary embodiments of the present disclosure will be described in detail hereafter with reference to the drawings. Although the exemplary embodiments of the present invention are shown in the drawings, it should be understood that the present invention can be realized in various forms and shall not be limited to the embodiments elaborated herein. On the contrary, the embodiments are provided such that the present invention can be understood more thoroughly and the scope of the present invention can be completely conveyed to a person skilled in the art.

The term "and/or" herein only describes an association relationship between associated objects, and can denote three relationships, for example, "A and/or B" can denote A, both A and B, and B. In addition, the character "/" herein generally denote that the former and latter associated objects are in an "or" relationship.

The external terminal protection device provided by the present invention includes an interface control module and a system control module. The interface control module provides an internal interface and an external interface, the internal interface being connected to a corresponding interface of a protected host, and the external interfaces being configured to access one or more external devices. The system control module is used for electrically connecting the interface control module, and controlling security authentication of the external device accessed to the one or more external interfaces on the interface control module. Therefore, the present invention provides a hardware form terminal protection device, and can protect the security of the protected host without installing security protection software on the protected host, thereby greatly reducing system security risks, and comprehensively solving potential security hazards that may be generated by the interfaces.

It should be noted that the term "module" in the present invention is a hardware module consisting of tangible electronic elements such as a circuit, a data processing apparatus, a memory, a buffer and the like. In the present invention, the interface control module and the system control module can be a physically or functionally independent element combination, and can also be a physically or functionally integrated integral element combination. For example, as an embodiment, the interface control module consists of an interface control board, and the system control module consists of a system control board; the interface control board and the system control board are both circuit boards integrated with electronic elements, and are connected via a bus. In other embodiments, the interface control module and the system control module can also be integrated on one circuit board. Therefore, the key of the present invention is a control relationship between the interface control module and the system control module, but not limited to the space or physical connection combination modes of the electronic elements forming the modules.

According to the present invention, when the external interface of the interface control module accesses the external device, the interface control module notifies the system control module that the system control module performs a security authentication operation on the external device. If the external device does not pass the security authentication, then the external device is set to be an unlicensed access device, and a physical circuit between the external device and the protected host is kept in a disconnected state; and/or if the external device passes the security authentication, then the external device is determined to be a licensed access device, and the physical circuit between the external device and the protected host is switched on. Therefore, the present invention realizes physically isolated security authentication of the external device, thereby improving the security performance of the protection system.

As a specific embodiment, the interface control module monitors in real time a connection state of the external interface accessing the external device, and automatically disconnects the physically connected circuit when the external device determined to be a licensed access device is unplugged from the external interface. Therefore, the present invention can prevent an unlicensed access device from accessing by utilizing the connection of a licensed access device.

Preferably, when the external device is re-accessed after being unplugged from the external interface, the system control module re-performs the security authentication operation on the external device. Therefore, the present invention can prevent the attack behavior utilizing the same external device.

Embodiment

FIG. 1 shows an application scenario of the protection system according to a first embodiment of the present invention.

As shown in FIG. 1, the external terminal protection device is externally connected to the protected host via interface connecting wires; the interfaces (USB interfaces UC1, UC2, a COM interface CC0, a network interface EC0)

on the protected host to be protected are connected to the internal interfaces of the external terminal protection device via various types of connecting wires, for example, the interfaces UC1 and UC2 of the protected host are respectively connected to internal USB interfaces UA4 and UA3 of the external terminal protection device, the serial interface CC0 is connected to an internal serial interface CA2, and the network interface EC0 is connected to an internal network interface EA2. Various external devices (a U disk, an optical disk driver, a serial interface connection device and the like) all access the external terminal protection device, and can communicate data with the protected host only via the external terminal protection device, for example, the U disk accesses an external interface UA1 of the external terminal protection device, the USB optical disk driver accesses an external interface UA2, and the serial interface connection device accesses an external interface CA1 The external devices such as a U disk, a USB optical disk driver, and a serial interface connection device which need to communicate data with the protected host cannot directly access the protected host, but must access corresponding external interfaces of the external terminal protection device to perform forwarding communication.

Figure 2:
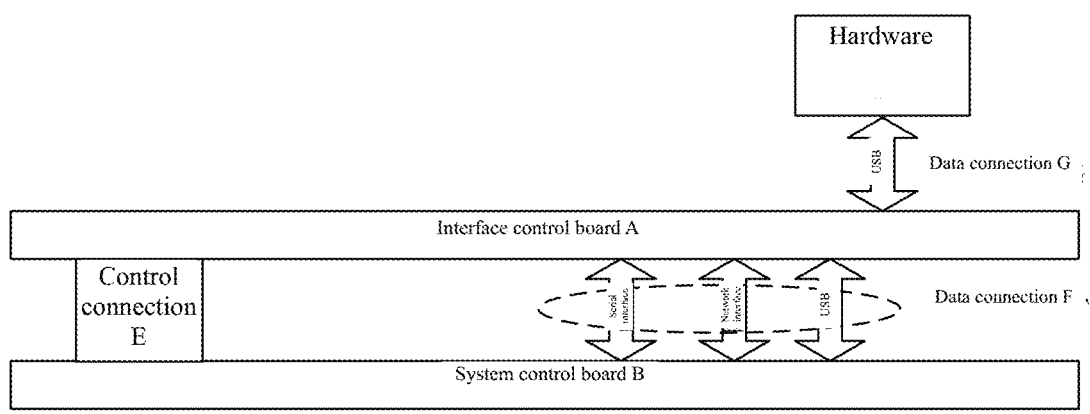
FIG. 2 is a schematic view of an internal structure of the external terminal protection device according to the first embodiment of the present invention.

FIG. 2 is a schematic view of an internal structure of the external terminal protection device according to the above embodiment of the present invention.

In the embodiment, the external terminal protection device mainly consists of an interface control board A and a system control board B, wherein the system control board B is connected to the interface control board A via a control connecting wire (for example, a bus), and is used to control different operating modes of interfaces on the interface control board A, such as a USB interface, a serial interface, and a network interface, so as to realize the function of performing security control on the access of various external devices. The system control board A can control the operating mode of each interface; the operating mode includes: available, not available, protocol filtration, flow mirroring, flow auditing and the like. However, the present invention is not limited to specific operating mode control types. The system control board B can be connected to the interface control board A via an interface I2C or SPI. However, the present invention is not limited to specific control connection interfaces.

The external terminal protection device further includes a hardware memory D which acts as an internal memory of the terminal protection device and is used for storing data exchanged between the interfaces; further, the internal memory can further store a preset security policy; and the system control board B performs security authentication on different types of interfaces or interfaces with different serial numbers on the interface control module by reading the preset security policy stored in the internal memory.

In the embodiment, the security functions realized by the external terminal protection device include but not limited to: an administrator presets a permission and a security policy for the external terminal protection device; the security policy includes but not limited to: a data import enabling policy (for example, a USB interface), a data export enabling policy (for example, a USB interface), a USB access device limitation policy (for example, a USB device based vendor ID, namely a supplier identification code, and/or a product ID, namely a product identification code), a data import anti-virus policy, a policy for controlling data export black and white lists, a data export format control policy, a serial interface access enabling policy, a USB interface plug-in protection policy, a network communication audit enabling policy, a firewall function enabling policy, a policy for serial interface command black and white lists and the like.

In a preferred embodiment, the security policy includes: after the administrator sets the security policies, the relevant security policies will be executed by the external terminal protection device one by one. In a preferred embodiment, the security policy includes: the administrator further controls whether the external terminal protection device enters a monitoring protection mode, in which mode the connection with the protected host will be monitored and an alarm will be sent in case of abnormality.

In a preferred embodiment, the security policy includes: when an abnormality alarm or an interface access situation needs to be recorded for the administrator to query subsequently, the internal memory D is further used to record alarm information or interface access log information.

In a preferred embodiment, the interface protection of the external terminal protection device can further include electrical security protection, and abnormality situation protection in use, and includes but not limited to: trying to forcedly bypass the external terminal protection device, and trying to access an illegal USB device after using a legal USB device to pass a security authentication.

In a preferred embodiment, the electrical security protection of the external terminal protection device refers to the external terminal protection device can effectively prevent, via the external interface such as a USB, the protected host from physical hardware damage, and can prevent the behavior of damaging the protected host by means of a strong discharging device such as a USB bomb.

In order to realize the object, a preferred embodiment of the present invention makes targeted designs for the electrical security protection from two aspects:

1) The Interface Adopts a Current and Voltage Limited Design

In the solution, the electrical security protection of the terminal protection device refers to that the device adopts a hardware design to prevent the damage of the strong discharging device, and introduces a current and voltage limited circuit to prevent current and voltage from too heavy, so as to construct a first protection system;

2) An External Device Connection Mechanism Based on Physical Switch Switching

The external terminal protection device introduces a hardware switching logic, and further improves the electrical security protection function. By taking a USB external device as an example, when a U disk device or other USB device is plugged in the terminal protection device, first necessary security authentication must be performed, and only the licensed device is allowed to perform the next operation; before passing the security authentication, the plugged USB device cannot be connected to the protected host. In other words, before the plugged external device passes the security authentication, no connected circuit is provided between the external device and the protected host. Therefore, even if the current and voltage limited design in the first protection layer does not play a due role, current and voltage surges caused by the plugged USB device would not influence the security of the protected host.

As an optional embodiment, the external terminal protection device has an interface abnormality situation protection function in use; the function mainly prevents from situations that a malicious user disconnects the circuit between the external terminal protection device and the protected host, tries to bypass the external terminal protection device and directly access the protected host, or uses a legal USB device to pass the security authentication and then replaces the legal device with an illegal USB device.

A preferred embodiment of the present invention makes targeted designs for the abnormality situation protection in use:

1) Interface Connection Locking, for Example, USB Connection Locking

A conventional interface is generally locked in a mechanical manner, namely via a special interface, for example, a special wide interface U disk or a special network interface used in the secret involved industry, so as to prevent misuse or prevent another person from plugging and unplugging the interface. Such interfaces have the defect of poor generality, and a device interface needs to be reconstructed to satisfy a mechanical connection requirement. Such interfaces are generally only suitable for mandatory management devices in special industries, are poor in implementation, and are easy to lead to device maintenance disputes.

The external terminal protection device provided by a preferred embodiment of the present invention has an interface locking function which is realized through an analog signal sampling and analog-to-digital conversion signal acquisition technology; when a specific interface of the external terminal protection device A is connected to a specific interface of the protected host B, the interface control board in the external terminal protection device monitors in real time the connection state of the internal specific interface connected to the protected host B; and when the connection state is abnormal, the disconnection of the circuit between the interface control board and the protected host is automatically triggered. Further, a current/voltage change of the internal interface is captured via a monitoring circuit; and when the connection state is determined to be abnormal, an alarm indication signal is triggered. Still further, after the disconnection of the circuit between the interface control board and the protected host is automatically triggered, the connection state restores from abnormality to normality, and the circuit between the interface control board and the protected host is still kept in the disconnected state. Taking a USB interface connection between the two as an example, the external terminal protection device A monitors in real time current and voltage situation of the interface connected to the protected host B, so as to obtain the situation of the connecting wire between the device A and the host B. When a malicious user unplugs the connecting wire between the device A and the host B, the monitoring circuit captures in time current and voltage changes, triggers an acousto-optic alarm, and triggers a disconnection operation; even if the user plugs the connecting wire back, the connection between A and B would not be automatically restored, instead, the restoration of the connection needs manual configuration of a user with an administrator permission.

2) External Device Plug and Unplug Monitoring

The external terminal protection device provided by the technical solution of the present invention has an external device plug and unplug monitoring function; the function refers to: the interface control board monitors in real time a connection state of the external interface accessing the external device, and automatically disconnects the physically connected circuit when the external device determined to be a licensed access device is unplugged from the external interface; further, when the external device is re-accessed after being unplugged from the external interface, the system control board 2 re-performs the security authentication operation on the external device. As an embodiment, when the user is authorized to perform data import and export operations, the external terminal protection device A effectively monitors the plugged external device (for example, a USB device) by monitoring the interface, and prevents the behavior that the user uses a legal device to pass security authentication and then unplugs the legal device and plugs an illegal device. Once the user unplugs the device, the system will automatically restore to an unauthorized disconnected state, so as to ensure device connection security to the most extent.

Figure 3:
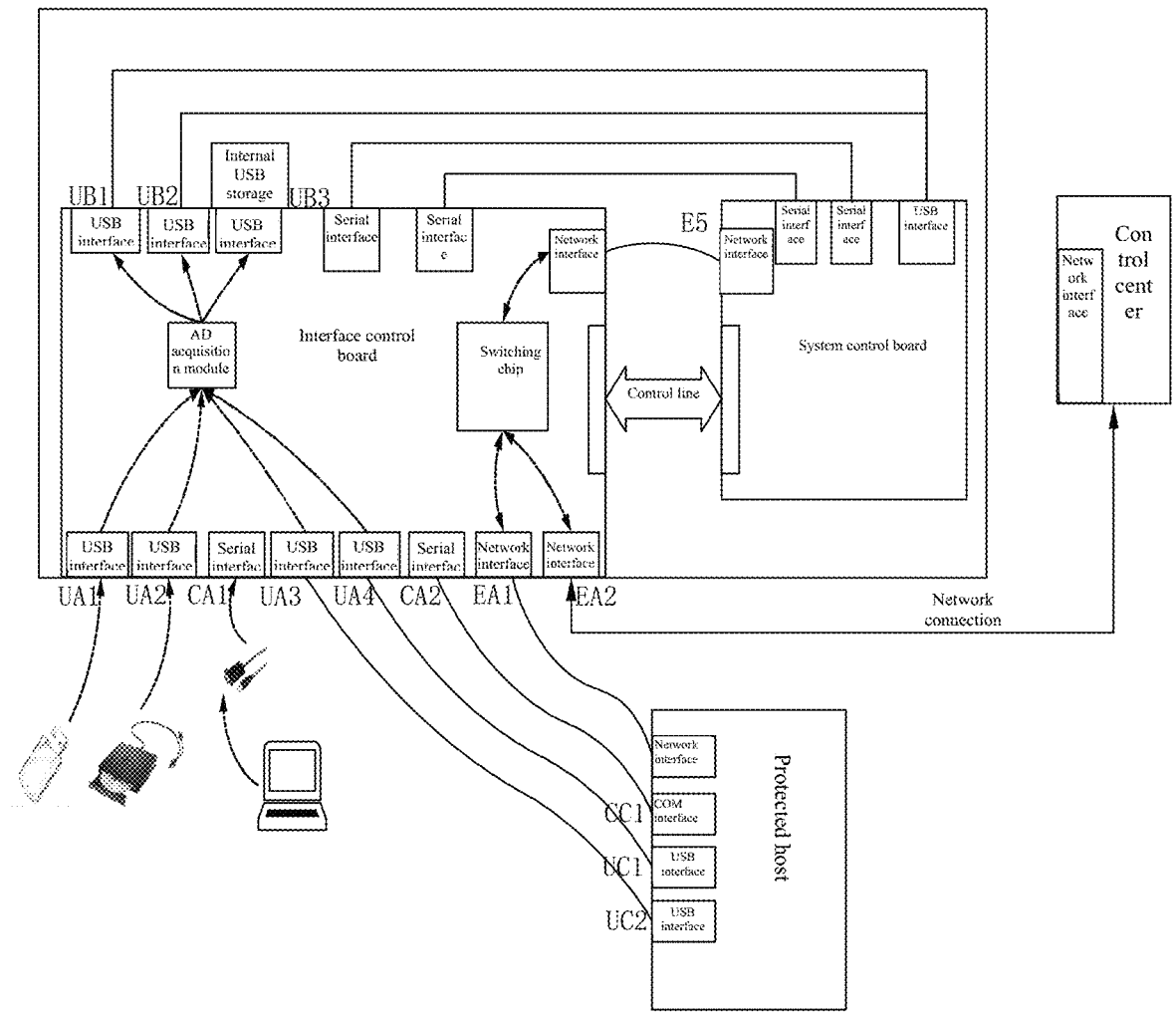
FIG. 3 is a connection view of the external terminal protection device according to a second embodiment of the present invention.

The terminal protection device provided in the solution has a plug-unplug monitoring and abnormality disconnection function; the function is realized by means of connection switching under the control of specific hardware, but not software; the design drawing of the hardware is as shown in FIG. 3.

FIG. 3 shows another embodiment of the present invention. The external terminal protection device of the embodiment has an interface control function, and adopts the solution that the hardware is connected/disconnected by switching on/off a hardware isolating switch on the basis of FPGA/single chip microcomputer control, so as to control the access switching of the external device.

Taking a USB control function as an example, the external terminal protection device of the embodiment includes an interface control board, an ARM/x86 based system control board, and an internal USB storage device, wherein the interface control board includes an AD acquisition module and a switching chip.

The interfaces of the interface control board are connected as shown in FIG. 3. UA1 and UB1, UA2 and UB2, UA3 and UB3, UA2 and UA4, UB1 and UB3 are switched via switches. The AD acquisition module detects the state of each interface; and the switching chip is configured to communicate network interface data between the protected host, the external terminal protection device, and a remote control center.

The hardware supports two control modes which respectively correspond to two use functions of the USB device: USB data import and export, and USB device direct-connection:

1) USB Data Import and Export Control Logic:

For the data import and export control logic of the external terminal protection device of the embodiment, the hardware connection situation is as follows: a USB connecting wire of the protected host is plugged in the internal interfaces UA3 and UA4; UB1 and UB2 access a USB interface of the system control board; a U disk to be accessed or a mobile storage medium is plugged in the external interface UA1; a USB optical disk driver device is plugged in UA2; and UB3 accesses the internal USB storage. In this way, the external terminal protection device takes over all the data interfaces of the protected host, such that the data communications using the interfaces of the protected host are all completed via the external terminal protection device.

Preferably, the protection system further includes a control center for remotely controlling the external terminal protection device, wherein the remote control center is connected to the network interface EA2 of the external terminal protection device via a network, and remotely controls the external terminal protection device, so as to achieve the object of protecting the security of the protected host without installing security protection software on the protected host.

2) USB Device Direct-Connection Control Logic:

The embodiment provides a solution for some non-storage USB devices to be directly accessed, such as a USB optical disk driver, an encryption lock and the like; the device direct-connection control logic controls, via the system control board, the hardware control logic of the interface control board to realize the control of the data flow of the USB device; the hardware connection situation is as follows: the internal USB interface UA4 of the interface control board in the terminal protection device is connected to the USB interface UC1 of the protected host; the forwarding interface UB2 accesses the USB interface of the system control board; the external device (for example, the USB optical disk driver) to be directly connected to the protected host B is plugged in the external USB interface UA2; and the interface control board is connected to the system control board via a control line.

Preferably, the terminal protection device adopts the following method to control USB device direct-connection: when the external device (for example, a USB optical disk driver) to be directly connected to the protected host B is plugged in the external USB interface UA2 of the terminal protection device, the interface control board notifies the system control board via the control line, and the system control board controls the hardware control logic of the interface control board to switch on the physical circuit between the interface UA2 and the forwarding interface UB2, such that the USB optical disk driver plugged in the interface UA2 is connected to the USB interface of the system control board. In the meanwhile, the hardware control logic keeps the physical circuit between the interface UA2 and the internal interface UA4 connected to the protected host in the disconnected state.

The system control board performs security authentication on the USB optical disk driver on the interface UA2, and determines whether the external device is a licensed access device; after the USB optical disk driver is determined to be a licensed access device, the hardware control logic switches on the physical circuit between the external interface UA2 and the internal interface UA4, so as to connect the USB optical disk driver plugged in the interface UA2 to the protected host.

When the system control board monitors that the connection states of one or more interfaces change, the hardware control logic automatically disconnects the physical circuits between the interfaces and other interfaces. For example, when the external device plugged in the interface UA2 accesses the interface UA4, the system control board monitors in real time the connection state of the external device plugged in the interface UA2 of the interface control board, and automatically disconnects the circuit once the external device is detected to be unplugged from the interface.

Figure 4:
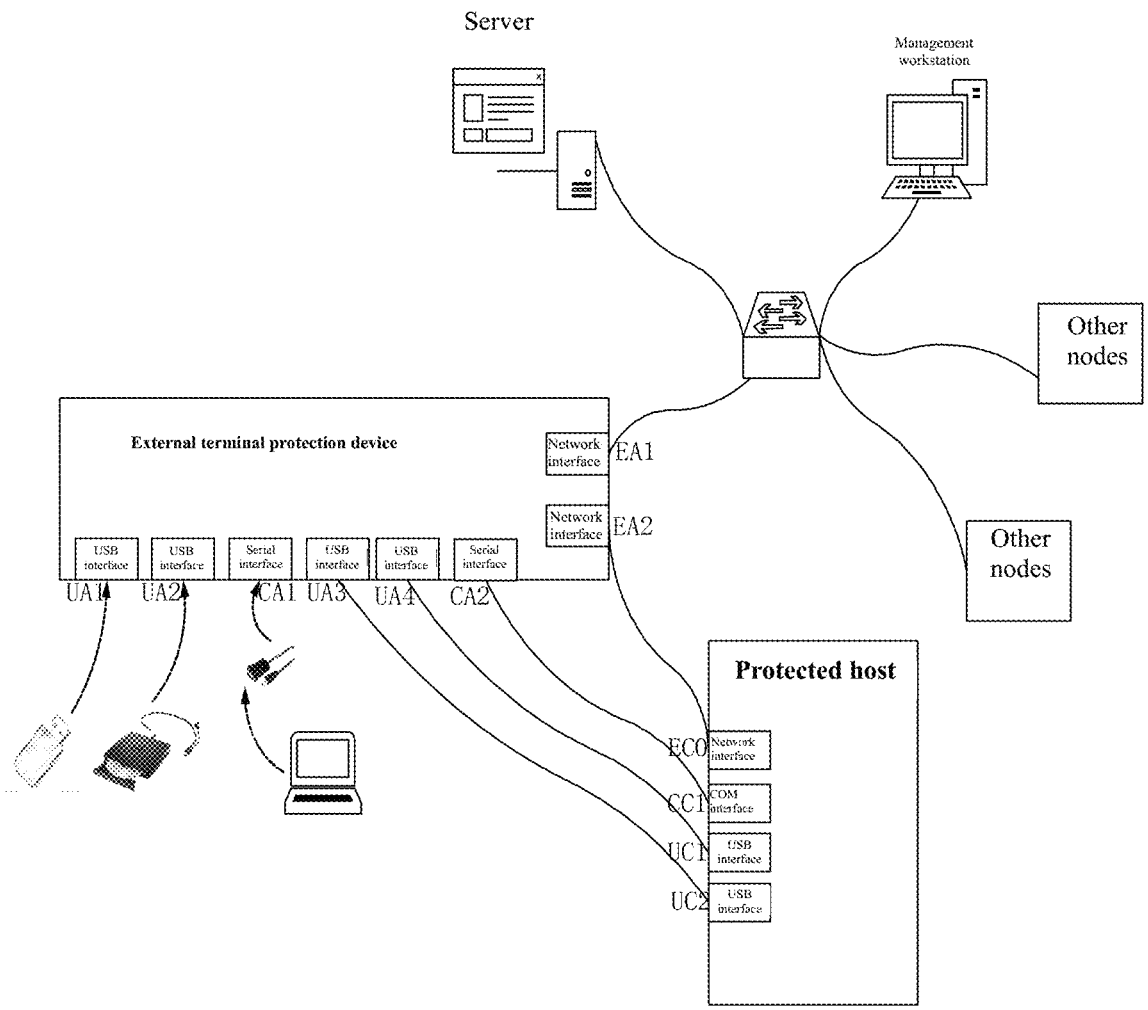
FIG. 4 is a network deployment view of the protection system based on the external terminal protection device according to a third embodiment of the present invention.

FIG. 4 is a network deployment embodiment of the protection system based on the external terminal protection device according to the present invention. The protection system includes one or more external devices, a protected host, and an external terminal protection device, wherein the external terminal protection device is externally connected to the protected host, such that the one or more external devices perform interface communication with the protected host via the external terminal protection device. Herein, the external terminal protection device is as described above, and will not be repeated here.

Further, the protection system further includes a control center for remotely controlling the external terminal protection device, wherein the control center consists of a server, a management workstation, and other nodes, and is connected to a network interface EA1 of the external terminal protection device via a network switching node.

In the description provided herein, a large number of specific details are described. However, it can be understood that the embodiments of the present invention can be implemented without the specific details. In some embodiments, commonly known methods, structures and technologies are not described in detail, so as not to obscure understanding of the description. Similarly, it should be understood that in order to simplify the present invention and help people understand one or more aspects of the present invention, in the description of the above exemplary embodiments of the present invention, the features of the present invention sometimes are together grouped into a single embodiment, a figure, or the descriptions thereof. However, the disclosed method should not be interpreted to reflect the following intention: the claimed invention claims more features than the features explicitly stated in each claim. Therefore, claims that follow a specific embodiment are hereby expressly incorporated into the specific embodiment, with each claim standing on its own as a separate embodiment of the disclosure.

Those skilled in the art may understand that the modules in the device in the embodiment may be adaptively changed and set in one or more devices different from the present embodiment. The modules or units or components in the embodiments may be combined into one module or unit or assembly, and furthermore, these may be divided into a plurality of submodules or subunits or sub-assemblies. Except that at least some of such features and/or processes or units are mutually exclusive, all features disclosed in this specification (including the accompanying claims, abstract, and drawings) and all processes or units of any method or device so disclosed may be combined in any combination. Unless otherwise stated, the features disclosed in the specification (including the accompanying claims, abstract, and the drawings) can be replaced with alternative features providing the same, equivalent or similar objects.

In addition, those skilled in the art can understand that although some embodiments described herein include certain features included in other embodiments and not others, combinations of features of different embodiments are meant to be within the scope of the disclosure and form different embodiments. For example, in the claims, any one of the claimed embodiments can be used in the form of any combination.

The component embodiment of the present invention can be realized as hardware, or a software module operating on one or more processors, or a combination thereof. A person skilled in the art should understand that in practice, a microprocessor or a digital signal processor (DSP) can be used to realize some or the entire functions of some or the entire components of a photographing and recording apparatus, a computing device, and a computer readable storage medium according to the literal contents of the embodiments of the present invention. The present invention can also be realized as a device or an apparatus program (for example, a computer program and a computer program product) for executing a part of or the entire method described herein. Such program realizing the present invention can be stored in a computer readable medium, or can adopt the form having one or more signals. Such signals can be downloaded from an Internet website, or provided on a carrier signal, or provided in any other form.

The invention claimed is:
1. An external terminal protection device, comprising:
an interface control module, used for providing one or more internal interfaces and one or more external interfaces, the internal interfaces being connected to a corresponding interface of a protected host, and the external interfaces being configured to access one or more external devices;

a system control module, used for electrically connecting the interface control module, controlling security authentication of the external device accessed to the one or more external interfaces on the interface control module, so as to determine whether the external device is a licensed external device, setting the external device to be an unlicensed access device and keeping a circuit between the external device and the protected host in a physically disconnected state if the external device does not pass the security authentication, and determining that the external device is a licensed access device and switching on a physical connection of the circuit between the external device and the protected host if the external device passes the security authentication;

an internal memory, used for storing data exchanged between the interfaces, storing a preset security policy, and performing security authentication on different types of interfaces or interfaces with different serial numbers on the interfaces control module by reading the preset security policy stored in the internal memory;

wherein the interface control module is further used for notifying the system control module that the system control module performs a security authentication operation on the external device when the external interface of the interface control module accesses the external device; and the interface control module is further used for monitoring in real time a connection state of the internal interface connected to the corresponding interface of the protected host, automatically triggering, when the connection state is abnormal, the disconnection of a circuit between the interface control module and the protected host, to be specific, capturing a current/voltage change of the internal interface via a monitoring circuit, determining that the connection state is abnormal, and triggering an alarm indication signal, and restoring the connection state from abnormality to normality after the disconnection of the circuit between the interface control module and the protected host is automatically triggered, and still keeping the circuit between the interface control module and the protected host in the disconnected state.

2. The external terminal protection device according to claim 1, wherein the interface control module monitors in real time a connection state of the external interface accessing the external device, and automatically disconnects the physically connected circuit when the external device determined to be a licensed access device is unplugged from the external interface.

3. The external terminal protection device according to claim 2, wherein when the external device is re-accessed after being unplugged from the external interface, the system control module re-performs the security authentication operation on the external device.

4. A protection system, comprising:
one or more external devices,
a protected host, and
the external terminal protection device as claimed in claim 3, wherein the external terminal protection device is externally connected to the protected host, such that the one or more external devices perform interface communication with the protected host via the external terminal protection device.

5. A protection system, comprising:
one or more external devices,
a protected host, and
the external terminal protection device as claimed in claim 2, wherein the external terminal protection device is externally connected to the protected host, such that the one or more external devices perform interface communication with the protected host via the external terminal protection device.

6. The external terminal protection device according to claim 1, wherein the system control module controls, on the basis of a preset security policy, the security authentication of the external device accessed to the one or more external interfaces on the interface control module.

7. A protection system, comprising:
one or more external devices,
a protected host, and
the external terminal protection device as claimed in claim 6, wherein the external terminal protection device is externally connected to the protected host, such that the one or more external devices perform interface communication with the protected host via the external terminal protection device.

8. The external terminal protection device according to claim 1, wherein the interface control module comprises a current and voltage limited circuit for preventing the external terminal protection device from being damaged when the external interface accesses a strong discharging device.

9. A protection system, comprising:
one or more external devices,
a protected host, and
the external terminal protection device as claimed in claim 8, wherein the external terminal protection device is externally connected to the protected host, such that the one or more external devices perform interface communication with the protected host via the external terminal protection device.

10. The external terminal protection device according to claim 1, wherein one or more of the internal interfaces and the external interfaces are USB interfaces.

11. A protection system, comprising:
one or more external devices,
a protected host, and
the external terminal protection device as claimed in claim 10, wherein the external terminal protection device is externally connected to the protected host, such that the one or more external devices perform interface communication with the protected host via the external terminal protection device.

12. A protection system, comprising:
one or more external devices,
a protected host, and
the external terminal protection device as claimed in claim 1, wherein the external terminal protection device is externally connected to the protected host, such that the one or more external devices perform interface communication with the protected host via the external terminal protection device.

* * * * *